3,225,085
SUCCINIC ACID DERIVATIVES
Charles J. Eby, North Springfield, Va., and Erhard J. Prill, Des Peres, Mo., assignors to Monsanto Company, a corporation of Delaware
No Drawing. Filed Sept. 15, 1961, Ser. No. 138,255
4 Claims. (Cl. 260—470)

This invention relates to new and useful succinic acid derivatives, biological toxicants containing these new compounds as an active ingredient, and fungicidal use of these new compounds.

The novel compounds of the invention are of the formula

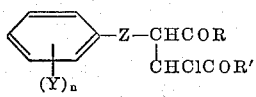

wherein Y is a halogen atom, preferably methyl, and $n$ is 0 or an integer from 1 to 5, i.e. an integer from 0–5, inclusive; Z is S, SO or $SO_2$; and R and R' taken together equal the radical —O— and taken separately R and R' are the hydroxy radical or lower alkoxy radicals. Lower is defined to mean an integer from 1 to 6, inclusive.

It is an object of this invention to provide new compounds.

It is another object of this invention to provide new and effective biological toxicant compositions.

It is another object of this invention to provide a new method of treating soil to kill or inhibit the growth of fungi.

These and other objects of the invention will become apparent as the detailed description of the invention proceeds.

An illustrative listing of the novel compounds of the invention is as follows: 2-chloro-3-(p-chlorophenylthio)succinic anhydride, 2-chloro-3 - (p-chlorophenylthio)succinic acid, methyl 2-chloro-3-(p-chlorophenylthio)succinate, dimethyl 2-chloro-3-(p-chlorophenylthio)succinate, diethyl 2-chloro-3-(o-chlorophenylthio)succinate, methyl ethyl 2-chloro - 3 - (m - chlorophenylthio)succinate, di-n-propyl 2-chloro-3 - (2,4-dichlorophenylthio)succinate, diisopropyl 2-chloro-3-(3,4,6-trichlorophenylthio)succinate, methyl t-butyl 2-chloro-3-(2,3,4,5-tetrachlorophenylthio)succinate, diethyl 2-chloro-3-(pentachlorophenylthio)succinate, di-n-pentyl 2-chloro-3 - (p-bromophenylthio)succinate, di-n-hexyl 2-chloro-3-(m-iodophenylthio)succinate, di-n-butyl 2-chloro - 3 - (o-fluorophenylthio)succinate, dimethyl 2-chloro-3-(phenylthio)succinate, diethyl 2-chloro-3-(p-tolylthio)succinate, diisopropyl 2-chloro-3 - (o-tolylthio)succinate, dimethyl 2-chloro - 3 - (m-tolylthio)succinate, methylisopropyl 2-chloro-3-(2,4-xylylthio)succinate, di-n-propyl 2-chloro-3-(2-chloro-4-bromophenylthio)succinate, diethyl 2-chloro-3-(3-methyl-4-fluorophenylthio)succinate, etc.

Illustrative of the sulfoxides and sulfones of the invention are the identical compounds named specifically in the previous paragraph with S being replaced by SO or $SO_2$.

By the same methods as are used to produce the substituted short-chain dialkyl succinates of the invention, substituted long-chain dialkyl succinates having up to about 22 carbon atoms per alkyl group can be made, e.g. di-oxo-tridecyl 2-chloro-(phenylthio, sulfinyl or sulfonyl) succinate, etc.

A suitable method of making a novel sulfide of the invention is to react an aromatic sulfenyl chloride with maleic anhydride, maleic acid, fumaric acid, or a maleate or fumarate. By this process approximately equal molar amounts of aromatic sulfenyl chloride are reacted with the ethylenically unsaturated compounds, and excess of the more readily available component can be present in the reaction mixture, e.g. as a reaction diluent. The reaction consumes approximately equal molar amounts of each reactant and when an excess of either component is used, it generally can be recovered unchanged at the close of the reaction. The rapidity of reaction varies greatly, depending on the reactants chosen, some reactions being exothermic and requiring solvents and/or diluents to moderate the violence of the reaction, while others do not reach completion until after a period of refluxing at elevated temperatures. Suitable inert solvents and diluents which can be employed in the reaction mixture, if desired, include hydrocarbons such as benzene, halogenated solvents such as carbon tetrachloride, oxygenated solvents free of active hydrogen such as ether, etc. A particularly preferred class of solvents are anhydrous organic carboxylic acids and especially glacial acetic acid, since this solvent also has the advantage of acting as a catalyst for the reaction. Mixtures of glacial acetic acid and an inert solvent such as ethylene dichloride can also be used as a solvent if desired.

The novel sulfoxides or sulfone compounds of the invention are prepared by the controlled oxidation of the corresponding sulfides, using $KMnO_4$, $CrO_3$, $H_2O_2$ in glacial acetic acid, $HNO_3$ in acetic anhydride, and similar oxidizing agents. The last named oxidizing agent, i.e. $HNO_3$ in acetic anhydride is especially suitable for preparing the sulfoxides. In preparing the sulfoxides using $H_2O_2$ in glacial acetic acid care must be taken not to carry the oxidation to the sulfones, but rather the oxidation is stopped at the intermediate stage for producing these sulfoxides.

The invention will be more clearly understood from the following detailed description of specific examples thereof:

Example 1

This example describes the preparation of diethyl 2-chloro-3-(p-chlorophenylthio)succinate. A mixture of 7.0 g. (0.095 mole) of p-chlorobenzenesulfenyl chloride, 16.3 g. (0.095 mole) of diethyl maleate and 50 ml. of glacial acetic acid was stirred and refluxed for 16 hours. The resulting reaction mixture was stripped under vacuum of acetic acid and other volatiles, and the residue was distilled to give 5.7 g. (35% recovery) of diethyl maleate and 22.8 g. (65% conversion, 100% yield) of diethyl 2-chloro-3-(p-chlorophenylthio)succinate, B.P. 162–164° C./0.65 mm. of Hg, $N_D^{25}$ 1.5574. An elemental analysis of the succinate product yielded the following results:

| Percent | Found | Calc'd for $C_{14}H_{16}Cl_2O_4S$ |
|---|---|---|
| C | 47.9 | 47.9 |
| H | 4.7 | 4.6 |
| S | 9.4 | 9.1 |
| Cl | 20.6 | 20.2 |

In Example 1 an equimolar amount of diethyl fumarate can be used instead of diethyl maleate.

If instead of p-chlorobenzenesulfenyl chloride in Example 1, an equal molar amount of pentachlorobenzenesulfenyl chloride, benzenesulfenyl chloride, a toluene-sulfenyl chloride, or a xylenesulfenyl chloride was used the resulting product would be diethyl 2-chloro-3-(pentachlorophenylthio)succinate, diethyl 2-chloro-3-(phenylthio)succinate, a diethyl 2-chloro-3-(tolylthio)succinate or a diethyl 2-chloro-3-(xylylthio)succinate, respectively Example 2

This example describes the preparation of diethyl 2-chloro-3-(p-chlorophenylsulfinyl)succinate. A sample of 20 ml. of acetic anhydride is cooled to 10° C. and 7 ml.

of fuming nitric acid is added with stirring. This nitric acid solution is then added cautiously to 35.0 g. (0.1 mole) of diethyl 2-chloro-3-(p-chlorophenylthio)succinate (prepared in a similar manner to Example 1) dissolved in 100 ml. of acetic anhydride. The temperature of the reaction mixture is controlled during the addition of the oxidizing agent below 15° C. by gradual addition and external cooling.

The mixture is then allowed to stand for three hours at 10°–15° C., and is poured into ice water. The aqueous phase is separated and the crude product is washed with water and dried. Further purification of the product can be carried out by recrystallization from ethyl alcohol or other suitable solvent, by stripping under high vacuum or by other conventional means. The resulting product is of course the desired diethyl 2-chloro-3-(p-chlorophenylsulfinyl)succinate.

If in Example 2 instead of a diethyl 2-chloro-3-(p-chlorophenylthio)succinate, there is used an equal molar amount of diethyl 2-chloro-3-(pentachlorophenylthio)succinate, diethyl 2-chloro-3-(phenylthio)succinate, a diethyl 2-chloro-3-tolylthio)succinate, a diethyl 2-chloro-3-(xylylthio)succinate the resulting product is diethyl 2-chloro-3-(pentachlorophenylsulfinyl)succinate, diethyl 2-chloro-3-(phenylsulfinyl)succinate, a diethyl 2-chloro-3-(tolylsulfinyl)succinate or a diethyl 2-chloro-3-(xylylsulfinyl)succinate, respectively.

*Example 3*

This example describes the preparation of diethyl 2-chloro-3-(p-chlorophenylsulfonyl)succinate. To a reaction flask is added 35 g. (0.1 mole) of diethyl 2-chloro-3-(p-chlorophenylthio)succinate prepared in a manner similar to that described in Example 1. To the flask is also added 100 ml. of glacial acetic acid. Then the addition is begun of 35 g. of 30% aqueous hydrogen peroxide. Addition of the hydrogen peroxide is controlled with cooling or heating as necessary to maintain the reaction temperature between about 45 and 70° C. After all the hydrogen peroxide has been added the reactants are maintained for 2 hours at 55°–60° C., then over a period of about 1 hour the temperature is raised to about 100° C. At the end of this reaction period the reaction mixture is poured into about 750 ml. of ice water. The aqueous layer is separated and the crude product washed with water. This crude product which is diethyl 2-chloro-3-(p-chlorophenylsulfonyl)succinate can be further purified by recrystallization from ethanol or by stripping of volatile contaminants under high vacuum or by other conventional means.

If in Example 3 instead of diethyl 2-chloro-3-(p-chlorophenylthio)succinate there is used an equal molar amount of diethyl 2-chloro-3-(pentachlorophenylthio)succinate, diethyl 2-chloro-3-(phenylthio)succinate, a diethyl 2-chloro-3-(tolylthio)succinate or a diethyl 2-chloro-3-(xylylthio)succinate there is obtained diethyl 2-chloro-3-(pentachlorophenylsulfonyl)succinate, diethyl 2-chloro-3-(phenylsulfonyl)succinate, a diethyl 2-chloro-3-(tolylsulfonyl)succinate or a diethyl 2-chloro-3-(xylylsulfonyl)succinate, respectively.

*Example 4*

This example illustrates the soil fungicidal activity of compounds of the invention by the testing of the product of Example 1. In this test method naturally infested soil fortified with fungi that incite root rots, stem cankers, seedling blights and seed decay, is treated with a test chemical and incubated in a sealed container for a period of 24 hours. Seeds are sown in the treated soil which is then incubated at 70° F. for 48 hours before being removed to greenhouse benches. Disease assessments are made two weeks later.

A uniform supply of infested soil containing the following organisms is prepared:

*Rhizoctonia solani*
*Fusarium oxysporum f. vasinfectum*
*Sclerotium rolfsii*
*Verticillium albo-atrum*
*Pythium ultimum*

A 6 milliliter aliquot of a 1% stock solution of a test chemical is pipeted into a mason jar containing 600 grams of infested soil. This initial application rate is 100 p.p.m. or approximately 200 lbs. per 6-inch acre. The jar is sealed and the contents are thoroughly mixed by vigorous shaking. The treated soil is incubated at 25° C. for 24 hours and is transferred to 4-inch azalia pots. Fifteen cotton and cucumber seeds are sown in each pot. The seeded pots are then incubated at 70° F. and at a high relative humidity (96–98%) to insure activity of the organisms in the soil. Forty-eight hours later the pots are removed to the greenhouse where disease assessments are made two weeks later.

In evaluating the tests the number of seedlings emerged and the number remaining healthy are recorded. The percent emergence and disease incidence is based on the inoculated, untreated, and the sterile soil treatments. The following rate scale is used:

| Rating: | Number of healthy plants/30 |
|---|---|
| E—Excellent | 26–30. |
| P—Promising | 19–25. |
| F—Fair | 11–18. |
| N—No Good | 10 or less. | in the evaluation host specificity, injury to shoots and roots, as well as other abnormalities are noted.

In addition to the tests of the product of Example 1, namely diethyl 2-chloro-3-(p-chlorophenylthio)succinate at 100 p.p.m. level the compound was also tested at 30 p.p.m. level. Soil fungicidal activity at the 100 p.p.m. level was promising and fair at the 30 p.p.m. level. Of the compounds of the invention the preferred compounds for soil fungicidal use are the phenyl, tolyl and xylyl thio-, sulfinyl- and sulfonyl succinates.

Depending on the particular use, the compounds of the invention are normally applied suspended, dispersed or dissolved in an inert carrier at concentrations of the chemical as low as 0.0001% to 1.0%, normally in the range of about 0.001 to 0.1%. In any event the inert carrier is usually present in a major amount, i.e. in excess of 50% by weight, and the chemical of the invention and other ingredients in minor amounts totally less than 50% by weight. The choice of diluent is determined by the use of the composition as is the concentration of the active ingredient in the diluent. Thus by admixture with an inert pulverulent carrier such as talc, bentonite, kieselguhr, diatomaceous earth, etc., there can be prepared compositions of the chemical suitable for biological toxicant use. Mixing the chemical of the invention with an emulsifying agent suitably in the presence of an organic solvent and then diluting with water to form an aqueous emulsion is a particularly desirable way of preparing the test chemicals for application. Suitable emulsifying agents include, e.g. alkylbenzenesulfonates, polyalkylene glycols, salts of sulfated long-chain alcohols, sorbitan fatty acid esters, etc.; other emulsifying agents which can be used to formulate emulsions of the present compounds are listed, e.g. in U.S. Department of Agriculture Bulletin E607.

In commercial application as soil fungicides, the compounds of the invention are applied to soil in concentrations in the range of about 2 to about 200 lbs./acre, preferably in the range of about 5 to about 100 lbs./acre, depending on the activity of the particular compound used, the nature of the soil, how badly the soil is infected with fungi, the particular types of fungi to be suppressed or destroyed, etc.

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A compound of the formula

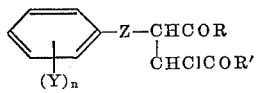

wherein Y is selected from the class consisting of halogen atoms and lower alkyl, $n$ is an integer from 0 to 5, Z is selected from the class consisting of S, SO and SO$_2$, and R and R' taken together are the —O— radical and taken singly are selected from the class consisting of hydroxy and lower alkoxy.

2. A compound of the formula

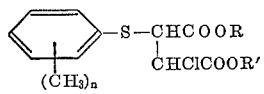

wherein $n$ is an integer from 0 to 2 and R and R' are lower alkyl.

3. A compound of the formula

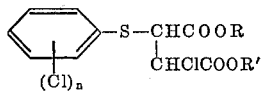

wherein $n$ is an integer from 1 to 5 and R and R' are lower alkyl.

4. Diethyl 2-chloro-3-(p-chlorophenylthio)-succinate.

References Cited by the Examiner

UNITED STATES PATENTS

| | | |
|---|---|---|
| 2,205,558 | 6/1940 | Flett. |
| 2,429,095 | 10/1947 | Tadd _____ 167—30 |
| 2,434,100 | 1/1948 | Bousquet _____ 260—470 |
| 2,642,373 | 6/1953 | Dazzi _____ 167—30 |
| 2,654,773 | 10/1953 | Zerbe _____ 260—470 |
| 2,689,864 | 9/1954 | Emerson et al. _____ 260—470 |
| 3,064,036 | 11/1962 | Heininger et al. ____ 260—470 |

OTHER REFERENCES

Burger: Medicinal Chemistry (New York, 1960), pages 75–7 and 1055.

LORRAINE A. WEINBERGER, *Primary Examiner.*

DURAL McCUTCHEN, LEON ZITVER, *Examiners.*